(12) United States Patent
Rout et al.

(10) Patent No.: US 10,522,980 B2
(45) Date of Patent: Dec. 31, 2019

(54) ELECTRICAL LOAD CENTER INCLUDING A REMOVABLE RAIL-TO-RAIL LINK ASSEMBLY

(71) Applicant: ABB Schweiz AG, Baden (CH)

(72) Inventors: Tapas Ranjan Rout, Hyderabad (IN); Leonardo Dorea Mascarenhas, Agawam, MA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/790,718

(22) Filed: Oct. 23, 2017

(65) Prior Publication Data

US 2019/0123523 A1 Apr. 25, 2019

(51) Int. Cl.
*H02B 1/20* (2006.01)
*H02B 1/056* (2006.01)

(52) U.S. Cl.
CPC ............ *H02B 1/207* (2013.01); *H02B 1/056* (2013.01); *H02B 1/205* (2013.01)

(58) Field of Classification Search
None
See application file for complete search history.

(56) References Cited

U.S. PATENT DOCUMENTS

| | | | | |
|---|---|---|---|---|
| 4,167,769 A | * | 9/1979 | Luke | ........................ H02B 1/056 361/637 |
| 4,785,377 A | * | 11/1988 | Rhodes | ................... H02B 1/056 361/637 |
| 5,946,179 A | | 8/1999 | Fleege et al. | |
| 7,449,645 B1 | * | 11/2008 | Flegel | ....................... H01R 4/64 200/50.32 |
| 7,508,653 B2 | | 3/2009 | Parlee | |
| 7,957,122 B2 | * | 6/2011 | Sharp | ..................... H02B 1/056 174/67 |
| 8,693,169 B2 | * | 4/2014 | Diaz | ...................... H02B 1/056 361/627 |
| 9,496,111 B1 | | 11/2016 | Titus | |
| 9,666,398 B2 | | 5/2017 | Robinson et al. | |
| 2014/0168862 A1 | * | 6/2014 | Wheeler | .................. H02B 1/20 361/640 |
| 2016/0217957 A1 | * | 7/2016 | Kumar | ................. H01H 71/002 |
| 2016/0314926 A1 | | 10/2016 | Watford | |

OTHER PUBLICATIONS

Cardoso, "Development of the Power System Protection—Low Voltage Switchgear MNS", Faculdade de Engenharia da Universidade do Porto, ABB—Automation Products Division, pp. 1-87, 2006, Porto.

* cited by examiner

*Primary Examiner* — Courtney L Smith
(74) *Attorney, Agent, or Firm* — Barnes & Thornburg LLP (57) ABSTRACT

An electrical load center includes a first mounting rail supporting a first row of circuit breakers, and a second mounting rail supporting a second row of circuit breakers. The load center also includes a first neutral bus bar spaced apart from the first mounting rail, a rail-to-rail link electrically coupled between the first mounting rail and the second mounting rail, and a first rail-to-neutral link electrically coupled between a first end of the rail-to-rail link and the first neutral bus bar.

18 Claims, 6 Drawing Sheets

ELECTRICAL LOAD CENTER INCLUDING A REMOVABLE RAIL-TO-RAIL LINK ASSEMBLY

BACKGROUND

The field of disclosure relates generally to an electrical load center and, more particularly, to an electrical load center in which a removable rail-to-rail link assembly is coupled between a first mounting rail, a second mounting rail, and at least one neutral bus bar of the electrical load center.

Arc fault circuit interrupt (AFCI) and ground fault circuit interrupt (GFCI) circuit breakers are well known and have recently made their way into more mainstream use (e.g., mainstream residential use). Traditionally, AFCI and GFCI circuit breakers have included a separate electrical connection (also referred to as a "pigtail" connection). Specifically, the pigtail connection functions to connect the AFCI or GFCI circuit breaker to a neutral bus bar of an electrical distribution center (or load center) that houses the AFCI or GFCI circuit breaker.

However, as the number of AFCI and/or GFCI circuit breakers mounted within a load center increases, one or more wiring gutters within the load center may become overcrowded and difficult to manage. Thus, an electrical load center in which a single rail-to-rail link assembly is substituted for a plurality of pigtail connections is desirable. More particularly, an electrical load center in which a removable rail-to-rail link assembly is coupled between a first mounting rail, a second mounting rail, and at least one neutral bus bar of the electrical load center is desirable.

BRIEF DESCRIPTION

In one aspect, an electrical load center is provided. The load center includes a first mounting rail supporting a first row of circuit breakers, and a second mounting rail supporting a second row of circuit breakers. The load center also includes a first neutral bus bar spaced apart from the first mounting rail, a rail-to-rail link electrically coupled between the first mounting rail and the second mounting rail, and a first rail-to-neutral link electrically coupled between a first end of the rail-to-rail link and the first neutral bus bar.

In another aspect, a removable rail-to-rail link assembly for use in an electrical load center is provided. The removable rail-to-rail link assembly includes a removable rail-to-rail link arranged to be electrically coupled between a first mounting rail and a second mounting rail within the electrical load center, a first rail-to-neutral link arranged to be electrically coupled between the first end of the removable rail-to-rail link and a first neutral bus bar within the electrical load center; and a second rail-to-neutral link arranged to be electrically coupled between a second end of the removable rail-to-rail link and a second neutral bus bar within the electrical load center.

In yet another aspect, a method of retrofitting an electrical load center to exclude a plurality of pigtail connections is provided. The method includes coupling a rail-to-rail link between a first mounting rail and a second mounting rail, and coupling a first rail-to-neutral link between the rail-to-rail link and a first neutral bus bar.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As described in greater detail below, an electrical load center may be used as a "service entrance" or a "non-service entrance." A service entrance may receive electrical power from a utility power line supplied to a structure, such as a residence, and a non-service entrance may receive electrical power from a service entrance. Thus, a load center functioning as a non-service entrance may be electrically coupled to a load center functioning as a service entrance downstream of the load center functioning as the service entrance.

Embodiments of the present disclosure relate to an electrical load center in which a rail-to-rail link assembly may be substituted for a plurality of pigtail connections commonly installed within the load center. More particularly, a plurality of pigtail connections typically extending from a plurality of AFCI and/or GFCI circuit breakers mounted in the load center may be excluded in favor of a single rail-to-rail link assembly. The rail-to-rail link assembly may include a rail-to-rail link that couples between a first electrically conductive mounting rail and a second electrically conductive mounting rail, a first rail-to-neutral link that couples a first end of the rail-to-rail link to a first neutral bus bar, and a second rail-to-neutral link that couples a second end of the rail-to-rail link to a second neutral bus bar.

The rail-to-rail link assembly may be configured, such that the load center is capable of functioning as a service entrance and/or a non-service entrance. Specifically, to configure the load center as a service entrance, the rail-to-rail link assembly may be implemented such that the first and second neutral bus bars are tied to ground. Alternatively, to configure the load center as a non-service entrance, the rail-to-rail link assembly may exclude one of the rail-to-neutral links, such that the first and second neutral bus bars are tied to a neutral wire of the load center.

Figure 1:
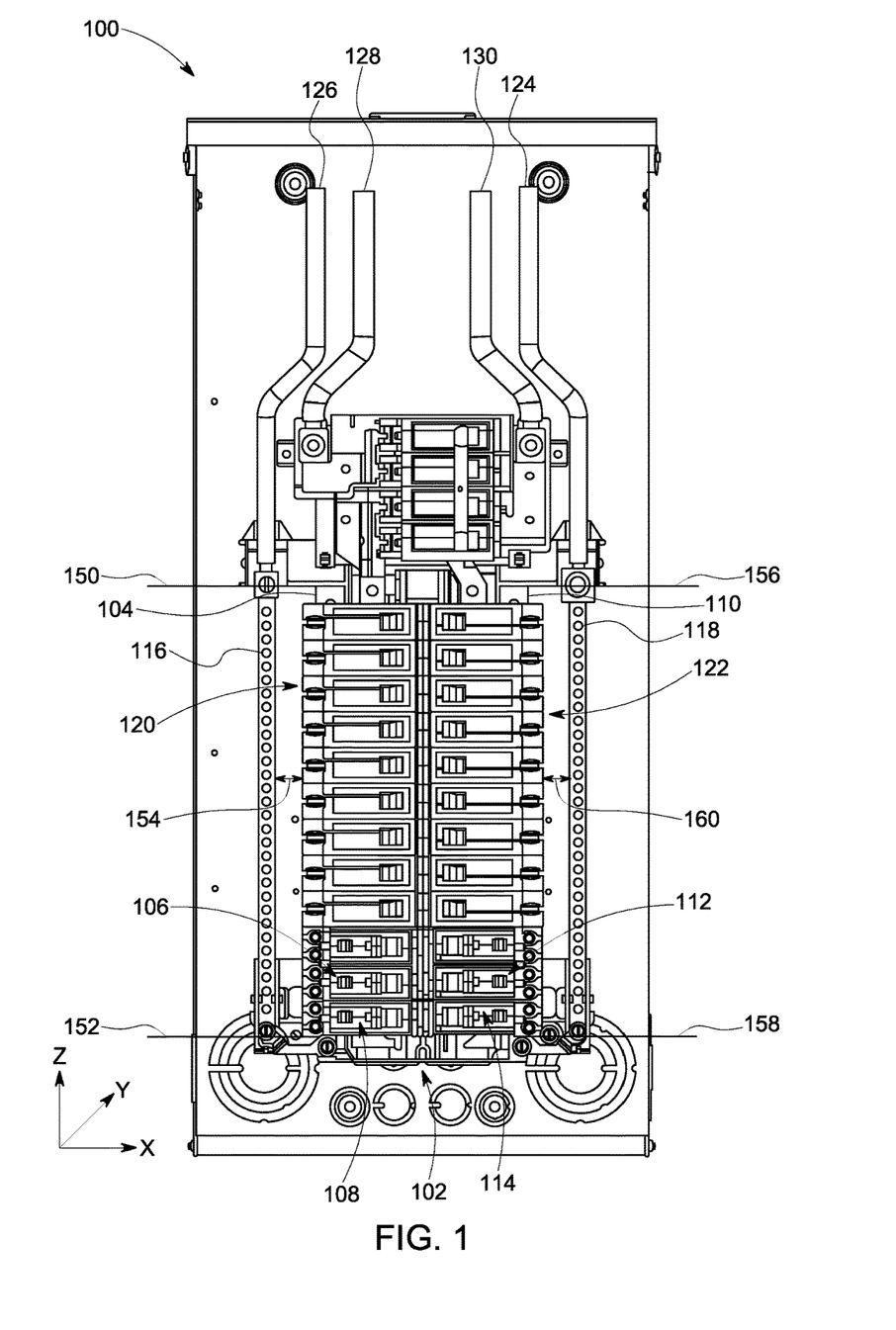
FIG. 1 is a front view of an exemplary electrical load center including a rail-to-rail link assembly, in which the load center is used as a service entrance.
Figure 2:
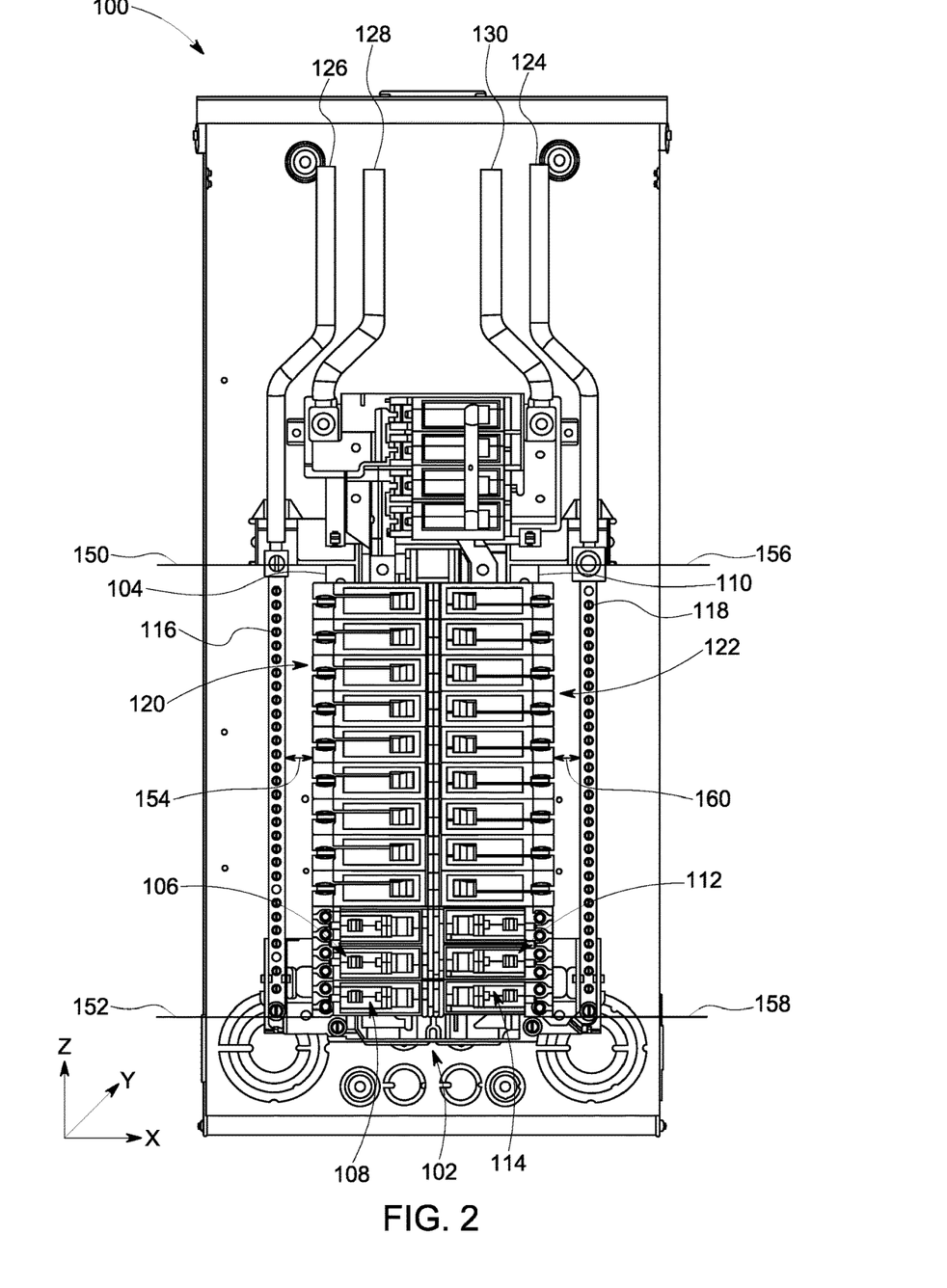
FIG. 2 is a front view of an exemplary electrical load center including a rail-to-rail link assembly, in which the load center is used as a non-service entrance.

FIG. 1 is a front view of an exemplary electrical load center 100 including a rail-to-rail link assembly 102, in which load center 100 is used as a service entrance. Similarly, FIG. 2 is a front view of load center 100 including rail-to-rail link assembly 102, in which load center 100 is used as a non-service entrance.

In the exemplary embodiment, load center 100 may include a first mounting rail 104 configured to receive a first plurality of circuit breakers 106, which may be organized along a first row 108. Load center 100 may also include a second mounting rail 110 configured to receive a second plurality of circuit breakers 112, which may be organized along a second row 114. To this end, first mounting rail 104 and second mounting rail 110 are elongated structural members and extend substantially parallel to a respective neutral bus bar (as described below). Accordingly, and as shown, circuit breakers 106 may be mounted on and supported by first mounting rail 104, and circuit breakers 112 may be mounted on and supported by second mounting rail 110. First mounting rail 104 and second mounting rail 110 may include any suitable electrically conductive material that is also capable of providing structural support to one or more circuit breakers 112. For example, first mounting rail 104 and second mounting rail 110 may be manufactured from an electrically conductive material such as brass or a brass alloy, phosphorous bronze, and/or any other suitable electrically conductive material.

Load center 100 may also include a first neutral bus bar 116 and a second neutral bus bar 118. As used herein, first neutral bus bar 116 and second neutral bus bar 118 may include any suitable electrically conductive element, such as an elongated electrically conductive element. Moreover, in the exemplary embodiment, first neutral bus bar 116 and/or second neutral bus bar 118 may be electrically connected to a power source, such as a distribution transformer (not shown) configured to supply electrical power to load center 100. Specifically, first neutral bus bar 116 and/or second neutral bus bar 118 may be electrically connected to a distribution transformer (such as through a neutral wire, as described below) to return electrical current flowing back to load center 100 from a load to the distribution transformer. In addition, and as described in greater detail herein, first neutral bus bar 116 and/or second neutral bus bar 118 may be electrically connected to ground (e.g., earth ground), such as through a ground wire.

First neutral bus bar 116 may include any suitable electrically conductive material and may be spaced apart from first mounting rail 104 and disposed substantially parallel to first mounting rail 104, and a first wiring gutter 120 may be defined between first neutral bus bar 116 and first mounting rail 104. Specifically, first neutral bus bar 116 and first mounting rail 104 extend generally parallel to a z-axis and extend from a first end 150 to a second end 152, as best shown at FIGS. 1 and 2. First neutral bus bar 116 and first mounting rail 104 are also spaced apart along an x-axis and separated by a gap 154. First wiring gutter 120 extends substantially the length of first mounting rail 104 and first neutral bus bar 116 along the z-axis, between first end 150 and second end 152, and is generally as wide as gap 154. In addition, as best shown with reference to FIG. 3, first wiring gutter 120 extends along a y-axis for a depth 322. In some embodiments, depth 322 is a distance between a first surface 324 of a mounting rail, such as either of first mounting rail 104 or second mounting rail 110, and a second surface 326 of the mounting rail, such as either of first mounting rail 104 or second mounting rail 110. In other embodiments, depth 322 may extend further, such as to an interior surface of a mounting enclosure (not shown) of load center 100. Thus, first wiring gutter 120 occupies a three dimensional volume of space that is generally as long as the distance between first end 150 and second end 152, as wide as gap 154, and as deep as depth 322.

Likewise, second neutral bus bar 118 may include any suitable electrically conductive material and may be spaced apart from second mounting rail 110 and disposed substantially parallel to second mounting rail 110, and a second wiring gutter 122 may be defined between second neutral bus bar 118 and second mounting rail 110. Specifically, second neutral bus bar 118 and second mounting rail 110 extend along the z-axis from a first end 156 to a second end 158, as best shown at FIGS. 1 and 2. Second neutral bus bar 118 and second mounting rail 110 are also spaced apart along the x-axis and separated by a gap 160. Second wiring gutter 122 extends along the z-axis substantially the length of second mounting rail 110 and second neutral bus bar 118, between first end 156 and second end 158, and is generally as wide as gap 160. In addition, as best shown with reference to FIG. 3, second wiring gutter 122 extends along the y-axis for depth 322, as described above. Thus, second wiring gutter 122 occupies a three dimensional volume of space that is generally as long as the distance between first end 156 and second end 158, as wide as gap 160, and as deep as depth 322.

In the exemplary embodiment, first neutral bus bar 116 may be electrically coupled to a neutral wire 124 (e.g., to electrically couple first neutral bus bar 116 to a distribution transformer, as described above), and second neutral bus bar 118 may be electrically coupled to a ground wire 126 (which may extend, through a grounding element, to earth ground). However, in other embodiments, first neutral bus bar 116 may be electrically coupled to ground wire 126, and second neutral bus bar 118 may be electrically coupled to neutral wire 124. In other words, the orientation of first neutral bus bar 116 and second neutral bus bar 118 with respect to neutral wire 124 and ground wire 126 is not important, except, as described below, as it relates to the configuration of rail-to-rail link assembly 102 within load center 100.

Circuit breakers 106 and circuit breakers 112 may include any suitable type of circuit breaker. For example, circuit breakers 106 and circuit breakers 112 may include any combination of arc fault circuit interrupter (AFCI) circuit breakers and/or ground fault circuit interrupter (GFCI) circuit breakers. However, in other embodiments, circuit breakers 106 and circuit breakers 112 may include one or more standard circuit breakers.

In the case of many existing AFCI and GFCI circuit breakers, each of circuit breakers 106 and 112 may include an additional electrical connection (also referred to as a "pigtail" connection), which may be configured to couple to first neutral bus bar 116 or second neutral bus bar 118, depending upon the placement of a particular circuit breaker 106 or 112 within load center 100. Typically, such pigtail connections may be configured for placement within a wiring gutter, such as one of first wiring gutter 120 and second wiring gutter 122.

However, as described herein, application of rail-to-rail link assembly 102 within load center 100 may obviate the use of one or more pigtail connections between circuit breakers 106 and/or circuit breakers 112 and a respective neutral bus bar 116 or 118. More particularly, one or more typically non-conducting (or poorly conducting) mounting rails, such as mounting rails manufactured from steel or a steel alloy, may be replaced by mounting rails that are better conductors of electrical current, such as first mounting rail 104 and/or second mounting rail 110, either or both of which may be tied, through rail-to-rail link assembly 102, to a neutral bus bar, such as first neutral bus bar 116 and/or second neutral bus bar 118. Circuit breakers 112 may be mounted on and electrically coupled to one of mounting rails 104 and/or 110 and tied to neutral (or ground, in the case of a service entrance), through mounting rails 104 and/or 110, rather than via one or more pigtail connections coupled between circuit breakers 112 and a respective neutral bus bar 116 or 118.

Figure 3:
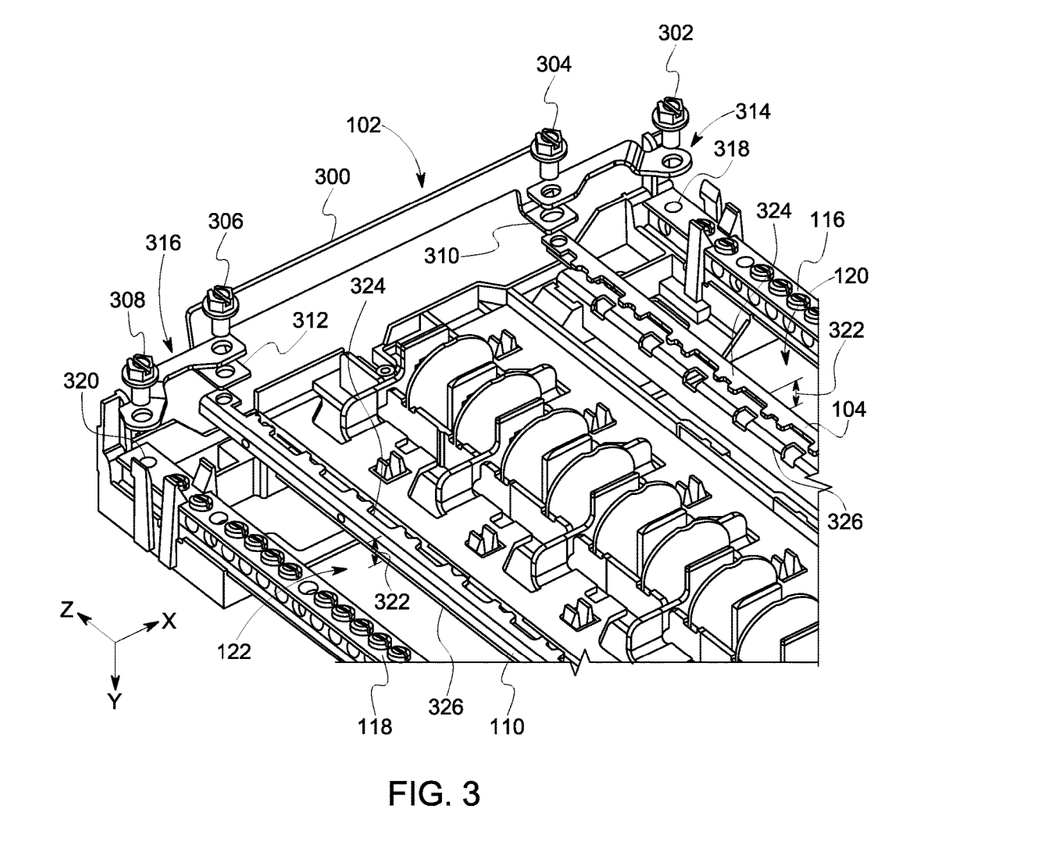
FIG. 3 is an exploded view of an exemplary electrical load center including a rail-to-rail link assembly.

More particularly, rail-to-rail link assembly 102 may be disposed outside of first wiring gutter 120 and/or second wiring gutter 122, such that first wiring gutter 120 and/or second wiring gutter 122 remain uncluttered by pigtail connections. Specifically, rail-to-rail link assembly 102 spans gap 154 and/or gap 160 (as described above), but does not impinge on or occupy the three dimensional volume of space (as described above) of first wiring gutter 120 and/or second wiring gutter 122. Rather, rail-to-rail link assembly 102 is coupled to first surface 324 of first mounting rail 104 and/or second mounting rail 110 (depending upon the specific configuration, as described herein) and does not extend in the direction of the y-axis into either of first wiring gutter 120 and/or second wiring gutter 122. In addition, although load center 100 may include an enclosure, first mounting rail 104 and/or second mounting rail 110 are not, in the exemplary embodiment, tied to a neutral bus bar by way of a connection or coupling to the enclosure. Rather, as described herein, first mounting rail 104 and/or second mounting rail 110 may be tied to first neutral bus bar 116 and/or second neutral bus bar 118 (and thus to neutral) only by rail-to-rail link assembly 102.

Load center 100 may include one or more other structures, such as one or more current carrying (or "hot" wires), such as hot wires 128 and 130, one or more circuit breaker mounting brackets, and the like. However, these structures are not central to an understanding of load center 100 and are not described in additional detail herein.

FIG. 3 is an exploded view of load center 100 including rail-to-rail link assembly 102. As shown, rail-to-rail link assembly 102 may include a rail-to-rail link 300, which may be attachable to and removable from load center 100, such as by way of a plurality of fasteners 302, 304, 306, and/or 308 (e.g., screws or bolts), and which may include a first end 310 and a second end 312. Specifically, in some embodiments, an existing load center 100 may be retrofitted with rail-to-rail link assembly 102. In other embodiments, rail-to-rail link assembly 102 may be manufactured with load center 100. In addition to rail-to-rail link 300, rail-to-rail link assembly 102 may include a first rail-to-neutral link 314 and/or a second rail-to-neutral link 316.

In various embodiments, rail-to-rail link 300 is an elongated member that is manufactured from any suitable electrically conductive material (e.g., copper, brass, bronze, phosphorous bronze, various alloys of these materials, and the like) and may be coupled between first mounting rail 104 and second mounting rail 110. Fasteners 304 and 306 may be inserted through one or more holes or apertures tapped in rail-to-rail link 300, first mounting rail 104 and second mounting rail 110 to mechanically and electrically couple rail-to-rail link 300 between first mounting rail 104 and second mounting rail 110.

In addition, first rail-to-neutral link 314 is an elongated member and is manufactured from any suitable electrically conductive material (e.g., copper, brass, bronze, phosphorous bronze, various alloys of these materials, and the like) and may be coupled between first end 310 of rail-to-rail link 300 and an end 318 of first neutral bus bar 116. Fasteners 302 and 304 may be used to couple first rail-to-neutral link 314 between first end 310 of rail-to-rail link 300 and end 318 of first neutral bus bar 116. Similarly, second rail-to-neutral link 316 is an elongated member that is manufactured from any suitable electrically conductive material (e.g., copper, brass, bronze, phosphorous bronze, various alloys of these materials, and the like) and may be coupled between second end 312 of rail-to-rail link 300 and end 320 of second neutral bus bar 118. Fasteners 306 and 308 may be used to couple second rail-to-neutral link 316 between second end 312 of rail-to-rail link 300 and end 320 of second neutral bus bar 118.

In the exemplary embodiment, one or both of first rail-to-neutral link 314 and second rail-to-neutral link 316 may be applied within load center 100 to configure load center 100 for use as a service entrance or a non-service entrance (described above). Specifically, where it is desirable to configure load center 100 as a service entrance, rail-to-rail link assembly 102 may be used to tie first neutral bus bar 116 and second neutral bus bar 118 to ground wire 126. Conversely, where it is desirable to configure load center 100 as a non-service entrance, one of first rail-to-neutral link 314 or second rail-to-neutral link 316 may be excluded from rail-to-rail link assembly 102. For instance, one of first rail-to-neutral link 314 or second rail-to-neutral link 316 may be excluded (depending upon which rail-to-neutral link would couple to an electrically grounded neutral bus bar), such that neutral bus bars 116 and 118 are not tied to ground, but to neutral wire 124. Thus, rail-to-rail link assembly 102 may be applied within load center 100, such that load center 100 may function as either a service entrance or a non-service entrance.

Figure 4:
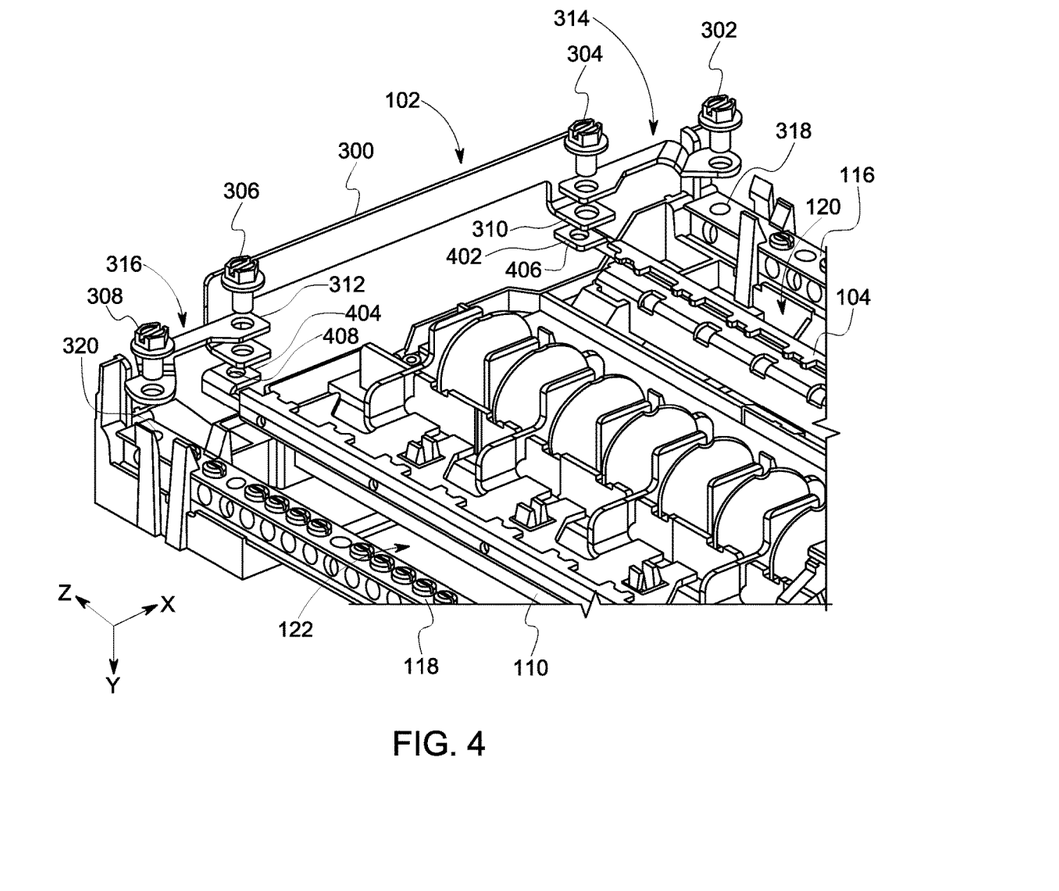
FIG. 4 is an exploded view of an exemplary electrical load center including a rail-to-rail link assembly, in which the electrical load center includes a first and second mounting rail including a first and second mounting tab, respectively.

FIG. 4 is an exploded view of load center 100 including rail-to-rail link assembly 102, in which first mounting rail 104 includes a first mounting tab 402, and in which second mounting rail 110 includes a second mounting tab 404. First mounting tab 402 and second mounting tab 404 may include rounded and/or bent-over portions, such that each tab 402 and 402 hooks or loops back over a respective mounting rail 104 and 110. Each of first mounting tab 402 and second mounting tab 404 may be tapped with a mounting aperture, through which a respective fastener 304 or 306 may be inserted to couple first rail-to-neutral link 314 and/or second rail-to-neutral link 316 on rail-to-rail link 300, first mounting rail 104, and/or second mounting rail 110. For example, first mounting tab 402 may include a first aperture 406, and second mounting tab 404 may include a second aperture 408.

Figure 5:
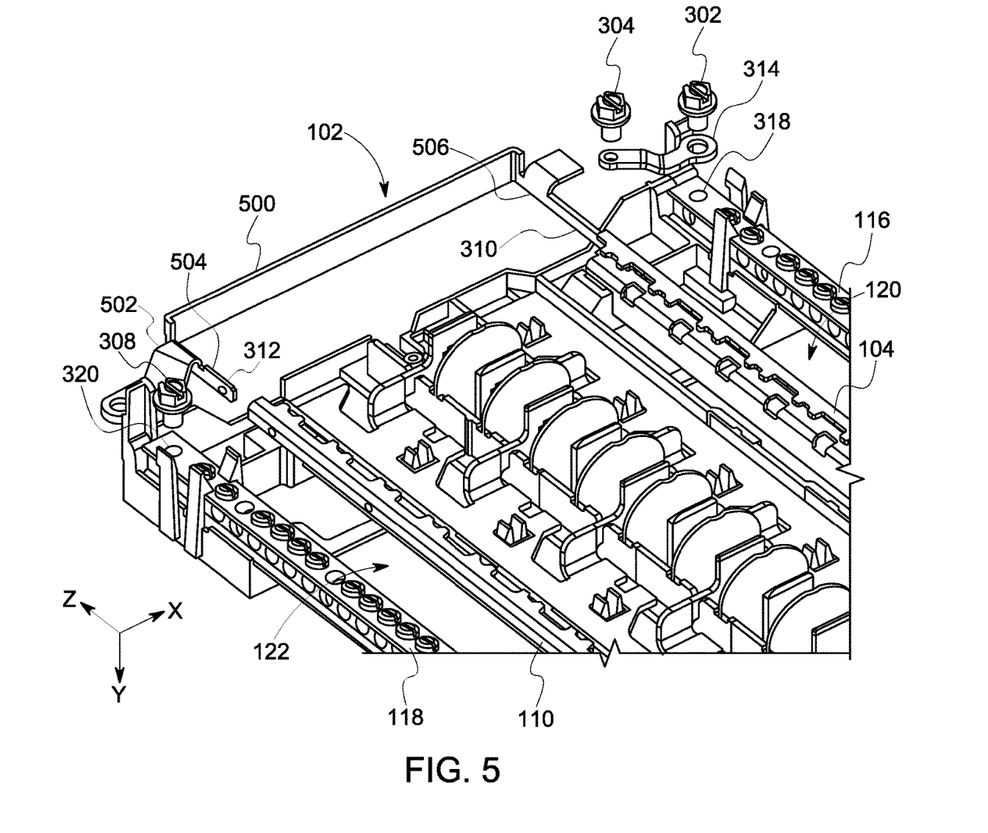
FIG. 5 is an exploded view of an exemplary electrical load center including a rail-to-rail link assembly, in which the rail-to-rail link assembly includes a rail-to-rail link that includes an integrally formed rail-to-neutral link.

FIG. 5 is an exploded view of load center 100 including rail-to-rail link assembly 102, in which rail-to-rail link assembly 102 includes a rail-to-rail link 500 that includes an integrally formed rail-to-neutral link 502. In the exemplary embodiment, integrally formed rail-to-neutral link 500 may extend from second end 312 of rail-to-rail link 300, such as, for example, to couple second mounting rail 110 to second neutral bus bar 118. In this embodiment, first end 310 of rail-to-rail link 500 may be coupled to and decoupled from first mounting rail 104 in the manner described above, such that load center 100 is capable of operation as a service and/or non-service entrance. In addition, in this embodiment, rail-to-rail link 500 may not mount on first mounting rail 104 and second mounting rail 110 as described above, but may include a first elongated member 504 and/or a second elongated member 506 configured to slidably couple with first and second mounting rails 104 and 110. In such an embodiment, first elongated member 504 and second elongated member 506 are manufactured from any suitable electrically conductive material, such as any of the electrically conductive materials described herein.

Figure 6:
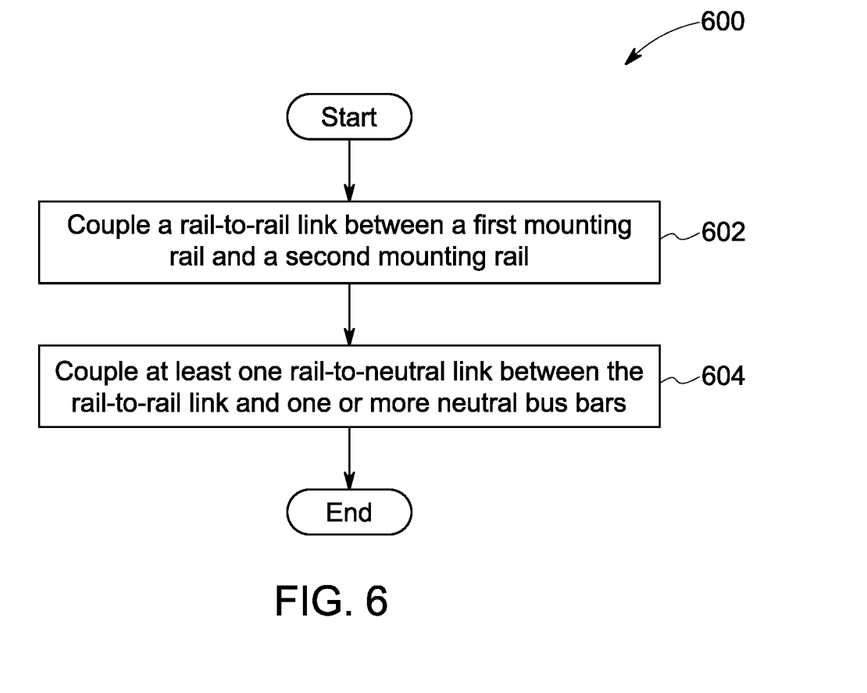
FIG. 6 is a flowchart illustrating an exemplary process of retrofitting an electrical load center to exclude a plurality of pigtail connections between a plurality of circuit breakers and a neutral bus bar.

FIG. 6 is a flowchart illustrating an exemplary process 600 of retrofitting load center 100 to exclude a plurality of pigtail connections between circuit breakers 106 and 112 and neutral bus bars 116 and 118. Accordingly, in the exemplary embodiment, rail-to-rail link 300 may be coupled between first mounting rail 104 and second mounting rail 110, such as by way of fasteners 304 and/or 306 (step 602). In addition, and as described herein, first rail-to-neutral link 314 and/or second rail-to-neutral link 316 may be coupled between removable rail-to-rail link 300 and one of first neutral bus bar 116 and/or second neutral bus bar 118 (step 604).

Embodiments of the electrical load center, as described above, thus facilitate substitution of a rail-to-rail link assembly for a plurality of pigtail connections commonly installed within the load center. More particularly, a plurality of pigtail connections typically extending from a plurality of AFCI and/or GFCI circuit breakers mounted in the load center may be excluded in favor of a single rail-to-rail link assembly. The rail-to-rail link assembly may include a rail-to-rail link that couples between a first electrically conductive mounting rail and a second electrically conductive mounting rail, a first rail-to-neutral link that couples a first end of the rail-to-rail link to a first neutral bus bar, and a second rail-to-neutral link that couples a second end of the rail-to-rail link to a second neutral bus bar.

The rail-to-rail link assembly may be configured, such that the load center is capable of functioning as a service entrance and/or a non-service entrance. Specifically, to configure the load center as a service entrance, the rail-to-rail link assembly may be implemented such that the first and second neutral bus bars are tied to ground. Alternatively, to configure the load center as a non-service entrance, the rail-to-rail link assembly may exclude one of the rail-to-neutral links, such that the first and second neutral bus bars are tied to a neutral wire of the load center.

Exemplary technical effects of the load center described herein include, for example: (a) removal of a plurality of cumbersome pigtail connections from one or more wiring gutters of the load center; (b) implementation of a rail-to-rail link assembly in the load center, such that the load center is configurable as a service entrance and/or a non-service entrance; (c) mounting of the rail-to-rail link assembly over the one or more wiring gutters, such that one or more mounting rails and/or one or more neutral bus bars are not extended during a design or retrofitting phase to accommodate the rail-to-rail link assembly, and such that the load center is fabricated as compactly as space-efficiently as possible; and (d) dynamic configuration and/or reconfiguration of the load center (e.g., during manufacturing or as part of a retrofit) as a service entrance and/or a non-service entrance.

Exemplary embodiments of a load center and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where a load center is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical load center comprising:
a first mounting rail arranged to support a first row of circuit breakers;
a second mounting rail arranged to support a second row of circuit breakers;
a first neutral bus bar spaced apart from the first mounting rail;
a rail-to-rail link comprising a first end and a second end, the first end of the rail-to-rail link mechanically and electrically coupled to the first mounting rail, and the second end of rail-to-rail link mechanically and electrically coupled to the second mounting rail; and
a first rail-to-neutral link electrically coupled to the first end of the rail-to-rail link and to the first neutral bus bar, the first rail-to-neutral link being removable from the electrical load center without disconnecting the rail-to-rail link from the first and second mounting rails.

2. The electrical load center of claim 1, further comprising:
a second neutral bus bar spaced apart from the second mounting rail; and a second rail-to-neutral link electrically coupled to the second end of the rail-to-rail link and to the second neutral bus bar.

3. The electrical load center of claim 1, wherein the first rail-to-neutral link is configured to be electrically coupled to the first end of the rail-to-rail link and to the first neutral bus bar when the electrical load center is used as a main service entrance.

4. The electrical load center of claim 1, wherein the first rail-to-neutral link is removable from the electrical load center when the electrical load center is used as a non-service entrance.

5. The electrical load center of claim 1, wherein the rail-to-rail link is electrically coupled to an end of the first mounting rail and to an end of the second mounting rail.

6. The electrical load center of claim 1, wherein the first mounting rail comprises a first mounting tab disposed at an end of the first mounting rail, the first mounting tab comprising a bent-over portion.

7. The electrical load center of claim 6, wherein the second mounting rail comprises a second mounting tab disposed at an end of the second mounting rail, the second mounting tab comprising a bent-over portion.

8. The electrical load center of claim 2, wherein the second rail-to-neutral link is one of (i) removable from said rail-to-rail link and (ii) integrally formed on said rail-to-rail link.

9. The electrical load center of claim 1, wherein the rail-to-rail link and the first rail-to-neutral link are mounted within the electrical load center, such that the rail-to-rail link and the first rail-to-neutral link are disposed over a first wiring gutter that extends between the first mounting rail and the first neutral bus bar.

10. The electrical load center of claim 1, wherein the first row of circuit breakers includes at least one of (i) an arc fault circuit interrupter (AFCI) circuit breaker and (ii) a ground fault circuit interrupter (GFCI) circuit breaker, and wherein the second row of circuit breakers includes at least one of (i) an AFCI circuit breakers and (ii) a GFCI circuit breaker.

11. A removable rail-to-rail link assembly for use in an electrical load center, the removable rail-to-rail link assembly comprising:
a removable rail-to-rail link comprising a first end and a second end, the first end of the rail-to-rail link arranged to be mechanically and electrically coupled to a first mounting rail within the electrical load center, and a second end of the rail-to-rail link arranged to be mechanically and electrically coupled to a second mounting rail within the electrical load center;
a first rail-to-neutral link arranged to be electrically coupled to the first end of the removable rail-to-rail link and to a first neutral bus bar within the electrical load center; and
a second rail-to-neutral link arranged to be electrically coupled to the second end of the removable rail-to-rail link and to a second neutral bus bar within the electrical load center, wherein the first rail-to-neutral link and the second rail-to-neutral link are each removable from the electrical load center without disconnecting the rail-to-rail link from the first and second mounting rails.

12. The removable rail-to-rail link assembly of claim 11, wherein the second rail-to-neutral link is arranged to be electrically coupled to the second end of the removable rail-to-rail link and to the second neutral bus bar when the electrical load center is used as a main service entrance.

13. The removable rail-to-rail link assembly of claim 11, wherein the second rail-to-neutral link is arranged to be removed from the electrical load center when the electrical load center is used as a non-service entrance.

14. The removable rail-to-rail link assembly of claim 11, wherein the removable rail-to-rail link is arranged to be mechanically coupled at the first end to a first mounting tab extending from the first mounting rail, and wherein the removable rail-to-rail link is arranged to be mechanically coupled at the second end to a second mounting tab extending from the second mounting rail.

15. The removable rail-to-rail link assembly of claim 11, wherein the removable rail-to-rail link assembly is arranged to be mounted within the electrical load center, such that the removable rail-to-rail link assembly is disposed over a first wiring gutter that extends between the first mounting rail and the first neutral bus bar, such that the removable rail-to-rail link assembly is not disposed within the first wiring gutter.

16. The removable rail-to-rail link assembly of claim 15, wherein the removable rail-to-rail link assembly is arranged to be mounted within the electrical load center, such that the removable rail-to-rail link assembly is also disposed over a second wiring gutter that extends between the second mounting rail and the second neutral bus bar.

17. A method of retrofitting an electrical load center to exclude a plurality of pigtail connections, the method comprising:
mechanically and electrically coupling a rail-to-rail link to a first mounting rail of the electrical load center and to a second mounting rail of the electrical load center in order to electrically connect the first and second mounting rails;
mechanically and electrically coupling a first rail-to-neutral link to the rail-to-rail link and to a first neutral bus bar of the electrical load center; and
removing the first rail-to-neutral link from the electrical load center without disconnecting the rail-to-rail link from the first and second mounting rails.

18. The method of claim 17, further comprising coupling a second rail-to-neutral link between the rail-to-rail link and a second neutral bus bar of the electrical load center.

* * * * *